United States Patent [19]
Van Eek et al.

[11] 3,928,573

[45] Dec. 23, 1975

[54] COMPOSITIONS OF MATTER

[75] Inventors: Theodoor Van Eek, Amerongen; Robert Beukers, Nootdorp, both of Netherlands

[73] Assignee: Gist-Brocades N.V., Delft, Netherlands

[22] Filed: Feb. 8, 1974

[21] Appl. No.: 440,724

[30] Foreign Application Priority Data
Feb. 9, 1973  United Kingdom.................. 6484/73

[52] U.S. Cl.................................. 424/122; 424/115
[51] Int. Cl.²......................................... A61K 27/00
[58] Field of Search ............ 424/122, 115, 117, 127

[56] References Cited
UNITED STATES PATENTS
3,279,923  10/1966  Bauer et al. .................... 424/115 X

FOREIGN PATENTS OR APPLICATIONS
7,111,168  2/1972  Netherlands......................... 424/115

*Primary Examiner*—Frederick E. Waddell
*Attorney, Agent, or Firm*—Hammond & Littell

[57] ABSTRACT

Mixture of compounds capable of promoting the growth of animals, e.g. live-stock, said mixture comprising: (a) a compound having growth-promoting properties and further the following physico-chemical properties: a solid, yellow, salt-forming weak acid containing the elements carbon, hydrogen, nitrogen and oxygen, consisting of equilibrium-forming components, poorly soluble in carbon tetrachloride and benzene, soluble in chloroform, methyl isobutyl ketone, butyl acetate, ethyl acetate, methanol and alkaline solutions, showing a slightly positive reaction in the aromate test, forming a red color with concentrated sulfuric acid, a dark brown color in the Pauly reaction, a dark red color and turbidity with ferric chloride, decomposing on heating, showing in the ultraviolet region of the spectrum absorption maxima at 233 and 327 nm, and in the infrared region absorption bands at 810, 860, 940, 980, 1090, 1215, 1355, 1455, 1540, 1650, 2390 and 3400 $cm^{-1}$, or a growth-promoting acceptable salt thereof, and (b) bacitracin or a growth-promoting acceptable salt or complex thereof, said mixture showing a synergistic growth-promoting action and to a method increasing the growth rate of warm-blooded animals.

11 Claims, No Drawings

COMPOSITIONS OF MATTER

STATE OF THE ART

For many years it has been common practice to add to the feed of fowl and live-stock such as chickens, turkeys, pigs and calves, certain antibiotics in low concentrations (1 to 50 ppm). It has been shown for at least some antibiotics that both growth and feed conversion are thereby improved. Examples of antibiotics used for this purpose are penicillin G (benzylpenicillin), streptomycin, tetracyclines, bacitracin, tylosin, and salts and/or complexes thereof.

In recent years, the use of antibiotics for this purpose has been the subject of criticism in those instances where the compounds can also be used for therapeutic purposes, i.e. as medicines. Fear is being generally expressed that strains of pathogenic bacteria may develop which would be resistant against these antibiotics or some of them, with the ensuing impossibility to combat such bacteria in humans by the same antibiotics when administered in the usual manner. Bearing this in mind, investigations have been conducted for new compounds with pronounced growth-promoting properties and devoid of the potential to be used as therapeutics. This has resulted in the discovery of new compounds and an example thereof is MYC 8003 (now called "mocimycin"), which is described in British Pat. No. 1,325,200. It is also claimed in commonly assigned, copending U.S. patent application Ser. No. 344,610 filed Mar. 26, 1973 which is a continuation-in-part of U.S. patent application Ser. No. 170,516 filed Aug. 19, 1971, now abandoned. Mocimycin is very promising as a growth-promoting agent for animals, especially live-stock.

OBJECTS OF THE INVENTION

It is an object of the invention to provide novel synergistic compositions for promoting the growth of warm-blooded animals.

It is another object of the invention to provide a novel animal feed which promotes animal growth.

It is an additional object of the invention to provide a novel method of increasing the growth rate of animals.

These and other objects and advantages of the invention will become obvious from the following detailed description.

THE INVENTION

The novel synergistic compositions of the invention are comprised of mixtures of mocimycin with bacitracin which show a more pronounced effect than with each of the growth-promoting agents alone so that smaller amounts of both compounds may be used in combination to obtain the same growth-promoting activity.

Therefore, the invention provides a mixture of compounds capable of promoting the growth of animals such as live-stock, said mixture comprising a. a compound having growth-promoting properties and further the following physico-chemical properties: a solid yellow salt-forming weak acid containing the elements carbon, hydrogen, nitrogen and oxygen, consisting of equilibrium-forming components, poorly soluble in carbon tetrachloride and benzene, soluble in chloroform, methyl isobutyl ketone, butyl acetate, ethyl acetate, methanol and alkaline solutions, showing a slightly positive reaction in the aromate test, forming a red color with concentrated sulfuric acid, a dark brown color in the Pauly reaction, a dark red color and turbidity with ferric chloride, positive periodate reaction, negative Fehlings, Tollens, Molisch, anthron, and biuret reactions, decomposes on heating, showing in the ultraviolet region of the spectrum absorption maxima at 233 and 327 nm, and in the infrared region absorption bands at 810, 860, 940, 980, 1090, 1215, 1355, 1455, 1540, 1650, 2390 and 3400 $cm^{-1}$, or a growth-promoting acceptable salt thereof, and b. bacitracin or a growth-promoting acceptable salt or complex thereof. This combination of growth-promoting agents shows a pronounced synergistic effect which cannot be predicted from the actions of each of the growth-promoting agents alone.

By the term "growth-promoting acceptable salt (or complex)" is meant a salt or complex of a compound described under (a) above such as its alkali metal and alkaline earth metal salts, or of bacitracin suitable for oral administration to an animal which retains the property of promoting the growth of animals and is not harmful to the animal at the amount orally taken by the animal.

It is an advantage of the invention that the growth-promoting activity of bacitracin and salts or complexes thereof, which are relatively cheap but which show only a limited level of growth-promoting activity, may be increased by only small amounts of a growth-promoting agent as mentioned under (a) above, so that a more economical use can be made of the mixture than of each of the components alone. It is an additional advantage of the invention that it should be less likely for microorganisms to develop resistance against each or both of the two growth-promoting agents, which do not have the same microbiological spectrum, when the two substances are administered together to animals than when either one of the substances alone is administered.

The growth-promoting agent mentioned under (a) above may be the growth-promoting agent "mocimycin". Examples of its salts which may be used according to the invention are the sodium, potassium and calcium salts.

Bacitracin is a polypeptide [Sci. 102 (1945), 376] which has been used as a growth-promoting agent for a long time, and especially its zinc complex (J. Bacteriol. 55 (1948) 249; U.S. Pat. No. 2,803,584) is used for that purpose. Zinc bacitracin is less bitter than bacitracin itself.

The compounds mentioned under (a) and (b) above may be mixed by methods known per se, e.g. by simply mixing the compounds together. The ratios by weight of compounds mentioned under (a) and compounds mentioned under (b), which are useful as growth-promoting agents according to the invention, may vary within a rather broad range, preferably between about 1:2 and 1:20, more preferably between about 1:4 and 1:10, respectively.

Another feature of the invention is to provide animal feedstuffs, especially in a form for use in feeding live-stock, e.g. chickens, turkeys, pigs and calves, supplemented with a significant growth-promoting proportion of a mixture of the compounds mentioned under (a) and (b) above, or growth-promoting acceptable salts or complexes thereof. The mixture may also be dispersed in, or mixed with, any suitable inert physiologically innocuous carrier or diluent, which is orally administrable to the animal, non-reactive with the growth-promoting agents and not harmful to the animals on oral administration. The mixture of growth-promoting agents or their salts or complexes may be conveniently incorporated in the feed, carrier or diluent by conventional methods such as milling, stirring or tumbling. Concentrates and feed supplements including the mixture of growth-promoting agents which may be mixed with other components of animal feedstuffs, are also within the invention. It is also possible to mix each of the growth-promoting agents separately into the feedstuffs, carrier or diluent.

Generally, the amount of the mixture of growth-promoting agents of the invention to give a satisfactory growth-promoting effect is about 3 to 100 ppm, preferably about 5 to 40 ppm by weight of the animal feed, dependent on the animal in question.

Administration of the mixture according to the invention to live-stock, e.g. chickens, turkeys, pigs and calves, may be done by methods known per se, and is preferably done in the form of administration with the animal feed over a period of several weeks to the animals when young.

In the following example, there are described several preferred embodiments to illustrate the invention. However, it should be understood that the invention is not intended to be limited to the specific embodiments.

EXAMPLE

Experiments were carried out with broiler chickens and the growth-promoting agents mocimycin and/or bacitracin as its zinc complex were mixed with the chicken feed (wheat flour). The amounts of the growth-promoting agents employed are specified in the following Table. The Table also shows the weight of the chickens after 3 and after 5 weeks in absolute figures and in percentages based on the weight of the control experiment in which neither compound was included in the feed administered to the chickens. Each of the figures given is the mean result with 6 groups of 15 chickens each.

growth-promoting agents are used together. For example, in order to obtain approximately the same increase in weight achieved with 3 ppm of mocimycin or of 20 ppm of zinc bacitracin, a combination of 1 ppm of mocimycin and 5 ppm of zinc bacitracin is required, i.e. considerably less than half of the amount of each of the growth-promoting agents alone.

Various modifications of the compositions and method of the invention may be made without departing from the spirit or scope thereof and it is to be understood that the invention is to be limited only as defined in the appended claims.

We claim:

1. A mixture of compounds capable of promoting the growth of fowl comprising (a) mocimycin or a growth-promoting acceptable salt and (b) bacitracin or its zinc complex thereof, the ratio of the compounds (a) and (b) is about 1:4 to about 1:10.

2. A mixture of claim 1 wherein compound (a) is the sodium salt of mocimycin.

3. A mixture of claim 1 wherein compound (b) is zinc bacitracin.

4. A fowl feed composition for promoting the growth of fowl comprising a fowl feed containing an effective amount of a growth-promoting mixture of claim 1.

5. The fowl feed of claim 4 wherein compound (a) is the sodium salt of mocimycin.

6. The fowl feed of claim 4 wherein compound (b) is zinc bacitracin.

7. The fowl feed of claim 4 wherein the effective amount of the mixture is 3 to 100 ppm.

8. The fowl feed of claim 4 wherein the effective amount of the mixture is 5 to 40 ppm.

9. A method for promoting the growth of fowl comprising orally administering to fowl a growth-promoting effective amount of the mixture of claim 1.

10. The method of claim 9 wherein compound (a) is the sodium salt of mocimycin.

11. The method of claim 9 wherein compound (b) is zinc bacitracin.

TABLE

| mocimycin ppm | zinc bacitracin ppm | 3 weeks I g | 3 weeks I % | 3 weeks II g | 3 weeks II % | 3 weeks III g | 3 weeks III % | 3 weeks mean % | 5 weeks I g | 5 weeks I % | 5 weeks II g | 5 weeks II % | 5 weeks III g | 5 weeks III % | 5 weeks mean % |
|---|---|---|---|---|---|---|---|---|---|---|---|---|---|---|---|
| 0 | 0 | 410 | | 422 | | 413 | | 100.0 | 945 | | 940 | | 937 | | 100.0 |
| 1 | 0 | | | 422 | 100.0 | 428 | 103.6 | 101.8 | | | 938 | 99.8 | 946 | 101.0 | 100.4 |
| 1.5 | 0 | 421 | 102.7 | | | | | 102.7 | 950 | 100.5 | | | | | 100.5 |
| 3 | 0 | 434 | 105.9 | 437 | 103.6 | 434 | 105.1 | 104.9 | 979 | 103.6 | 953 | 101.4 | 957 | 102.1 | 102.4 |
| 0 | 10 | 427 | 104.1 | 438 | 103.8 | 432 | 104.6 | 104.2 | 965 | 102.1 | 943 | 100.3 | 963 | 102.8 | 101.7 |
| 0 | 20 | 434 | 105.9 | | | | | 105.9 | 972 | 102.9 | | | | | 102.9 |
| 1 | 5 | 433 | 105.6 | | | | | 105.6 | 980 | 103.7 | | | | | 103.7 |
| 1 | 10 | 447 | 109.0 | 451 | 106.9 | 439 | 106.3 | 107.4 | 993 | 105.1 | 974 | 103.6 | 969 | 103.4 | 104.0 |
| 1.5 | 5 | 436 | 106.3 | | | | | 106.3 | 967 | 102.3 | | | | | 102.3 |

The results of the experiments indicated in the Table show clearly the synergistic effect achieved when both

* * * * *